US006923851B1

(12) United States Patent
Butler et al.

(10) Patent No.: US 6,923,851 B1
(45) Date of Patent: Aug. 2, 2005

(54) BLUE SMOKE CONTROL COLLECTOR SYSTEM

(75) Inventors: Michael Butler, Yorba Linda, CA (US); Michael Justice, Seal Beach, CA (US)

(73) Assignee: Butler-Justice, Inc., Long Beach, CA (US)

( * ) Notice: Subject to any disclaimer, the term of this patent is extended or adjusted under 35 U.S.C. 154(b) by 0 days.

(21) Appl. No.: 10/425,627

(22) Filed: Apr. 30, 2003

(51) Int. Cl.[7] .......................... B01D 46/12; B01D 53/04
(52) U.S. Cl. ........................ 96/135; 96/136; 96/140; 96/142; 96/153; 55/324; 55/472
(58) Field of Search .......................... 96/121, 126–128, 96/132, 134–136, 139, 140, 142, 153, 154; 55/318, 319, 321–324, 332, 467, 470–472

(56) References Cited

U.S. PATENT DOCUMENTS

| | | | | |
|---|---|---|---|---|
| 2,096,851 A | * | 10/1937 | Fricke | 96/132 |
| 2,421,776 A | * | 6/1947 | Dollinger | 55/323 |
| 2,528,539 A | * | 11/1950 | Norgren et al. | 96/117.5 |
| 2,698,061 A | * | 12/1954 | Jaubert | 96/136 |
| 2,701,624 A | * | 2/1955 | Krieble | 96/136 |
| 3,010,537 A | * | 11/1961 | Baker et al. | 55/323 |
| 3,063,220 A | * | 11/1962 | Almquist | 96/246 |
| 3,201,924 A | * | 8/1965 | Fulford et al. | 55/324 |
| 3,246,455 A | * | 4/1966 | Boddy | 55/319 |
| 3,252,270 A | * | 5/1966 | Pall et al. | 95/143 |
| 3,308,610 A | * | 3/1967 | Springer et al. | 55/471 |
| 3,353,340 A | * | 11/1967 | Carsey | 55/324 |
| 3,527,027 A | * | 9/1970 | Knight et al. | 96/134 |
| 4,203,739 A | * | 5/1980 | Erdmannsdorfer | 55/323 |
| 5,064,453 A | * | 11/1991 | Jacquish | 96/112 |
| 5,069,691 A | * | 12/1991 | Travis et al. | 96/57 |
| 5,145,497 A | * | 9/1992 | Maeda | 96/409 |
| 5,286,283 A | * | 2/1994 | Goodell | 96/113 |
| 5,330,723 A | * | 7/1994 | Martin et al. | 422/122 |
| 5,427,609 A | * | 6/1995 | Zoglman et al. | 95/98 |
| 5,591,244 A | * | 1/1997 | Vross et al. | 55/356 |
| 5,718,744 A | * | 2/1998 | Ehlert | 96/189 |
| 5,873,919 A | * | 2/1999 | Vross et al. | 55/315.1 |
| 5,902,362 A | * | 5/1999 | Paoluccio | 55/418 |
| 5,910,291 A | * | 6/1999 | Skalla et al. | 422/171 |
| 6,156,089 A | * | 12/2000 | Stemmer et al. | 55/467 |
| 6,267,794 B1 | * | 7/2001 | Losma | 55/394 |
| 6,485,535 B1 | * | 11/2002 | Linnersten et al. | 55/319 |

* cited by examiner

Primary Examiner—Robert H. Spitzer
(74) Attorney, Agent, or Firm—G. Donald Weber, Jr.

(57) ABSTRACT

The blue smoke control collector system is used for the collection of the blue haze which is actually comprised of tiny oil droplets that hover over hot asphaltic concrete mix. The system is designed to collect and filter the air generated at hot mix asphalt transfer points, asphaltic concrete silo loading areas and truck loading areas and to remove the oil therefrom. Oil captured in the system settles into a plenum and is then drained therefrom for suitable disposal. The filtered air can be released in to the atmosphere. An optional activated charcoal filter stage can be included to reduce odor in the released air.

20 Claims, 2 Drawing Sheets

BLUE SMOKE CONTROL COLLECTOR SYSTEM

BACKGROUND

1. Field of the Invention

This invention is directed to a unique filtration system, in general, and to a filtration system for filtering "blue smoke" oil droplets from the atmosphere, in particular.

2. Prior Art

Blue Smoke is actually tiny oil droplets that make-up the blue haze that is typically associated with paving as well as the characteristic asphalt odor. Air pollution control agencies are becoming more concerned with blue smoke, especially as rubberized asphalt, recycled asphalt pavement (RAP) and polymer blends are more routinely specified. These specialty mixes are often known to produce an increased amount of "Blue Smoke." More Blue Smoke usually causes a greater number of neighborhood complaints for visible emissions and odor, all of which results in more frequent inspections and a higher potential for being cited by air pollution agencies.

Typical systems include electrostatic precipitators, heating ventilating and air conditioning (HVAC) type filter units, baghouse-type devices with a bag coating substance which resembles "kitty litter," and a recycle system that directs the blue smoke laden air into the combustion zone of the asphalt plant burner, with the intent to incinerate the oil droplets. Each of these technologies and the shortcomings thereof are briefly summarized in the following sections.

Electrostatic precipitators. This technology makes use of a series of cathodes and anodes, which are positioned to cause the oil droplets in the air to take on an electrical charge. The charged oil droplets are attracted to and then adhere to the opposite charged plates. As the oil accumulates on the plates, it builds up and then drips down into an oil collection chamber.

This technology has several shortcomings. In addition to being very expensive when compared to other technologies, it is somewhat dangerous when not properly maintained. Electrostatic precipitators are known to catch fire. They are also somewhat cumbersome to maintain. Special technicians are required to service the complex electronic circuitry. In addition, the clean up procedures include a periodic wash down process that creates a quantity of contaminated wash water that requires special disposal considerations.

Heating, ventilating and air conditioning filter units (HVAC). This technology makes use of a series of HVAC type filters that use a filter media to catch the oil droplets entrained in the air.

This technology has several shortcomings. Although the initial cost is considered moderate, its collection efficiency lowers with continued use, thus, rendering a higher operating cost if the unit is to operate at maximum efficiency. The problems stem from the typical horizontal airflow design of the unit. The horizontal airflow design causes the filters to load up with oil. As the filters load up, the air, instead of passing through the filters, goes around the filters. This phenomenon is generally referred to a "blow by," and is a major problem for this technology. When the filters load up they become saturated and must be replaced to assure proper collection efficiency.

Baghouse device with a kitty litter bag coating component. This technology makes use of a baghouse-type device that is made up of a number of bags composed of a fabric filter media, similar in concept to a huge vacuum cleaner and are typically utilized for collecting dust from dust generating activities. As such, they are not suitable for capturing oil droplets entrained in an air stream. In this case, the aforementioned coating envelopes each fabric bag and absorbs the oil entrained within the air stream. When the coating becomes saturated with oil the baghouse collector is shut down and the coating is shaken off the bags or a jet of air is injected into each bag to blow off the saturated material. The baghouse device is designed with a collection hopper to hold the saturated coating material. When the hopper fills, the collector must be opened up and the coating material must be removed for proper disposal.

This technology has significant shortcomings. The technology is known to be moderate to high priced and to require a considerable amount of hands-on operational requirements. In order to assure effective collection efficiency, the equipment operator must monitor the pressure drop across the filter bags. When the reading indicates that the coating substance is saturated, the operator much schedule downtime when the material can be removed from the unit and replaced with clean materials. The saturated coating material must then be properly marked for environmentally appropriate disposal.

Recycle system that directs the blue smoke laden air into the combustion zone of the asphalt plant burner. This technology makes use of a booster fan that draws the oil-laden air from the top of the asphalt silos or the silo loading equipment. The oil-laden air is injected into the combustion zone of the asphalt plant burner. The burner is designed to deliver enough heat into the asphalt aggregate to drive off excess moisture and raise the aggregate to specification temperature. The burner is designed to transfer heat into the aggregate and it is not designed to function as an incinerator. The process functions reasonably well to remove the blue smoke from the top of the silo and silo loading equipment, but it is not an efficient incinerator.

This technology has significant shortcomings. The inefficient incinerator feature results in excessively high emissions of other air pollutants. In addition, the amount of exhaust air that can be sent to the combustion zone is limited. This inherent limitation means that although air at the top of the silo can be controlled, the air at the larger and more visible truck loadout area cannot be controlled.

SUMMARY OF THE INSTANT INVENTION

The system of the invention is placed adjacent to an area of asphalt handling, loading or the like. During normal operation of the instant system, contaminated air enters the Blue Smoke Control collection system through the dirty air inlet manifold which is located at the lower end of the system. The incoming air slows and turns upward, thereby causing larger oil mist droplets and particles to fall out of the airstream and settle into the dirty air plenum at the bottom of the system.

The air passes vertically upward through a plurality of generally planar and horizontal filter stages, which are designed to collect and coalesce large droplets and particles. These stages are, typically, reusable and may be cleaned periodically.

A further planar and horizontal filter stage is, typically, utilized to provide another level of filtration for the air that has passed through the first filter stage but still contains smaller oil droplets. This stage is, typically, a disposable filter that can be replaced when it becomes plugged or clogged.

The output filter stage is, typically, vertically configured and includes a flexible filter that wraps around a cylindrically shaped filter. The wrap filter stage collects and coalesces oil mist into larger droplets. The cylindrically shaped filter comprises a pleated medium designed to collect, coalesce and drain fine oil mists from the air stream. The vertical orientation of the output filter stage promotes drainage of the collected droplets into a dirty air plenum at the bottom of the system. The air which passes through the cylindrical filter is, typically, free of contaminants and can be vented to the atmosphere.

An optional odor reducing or eliminating stage, typically including an activated charcoal filter, can be included at the output of the system, if so desired.

DESCRIPTION OF A PREFERRED EMBODIMENT

Figure 1:
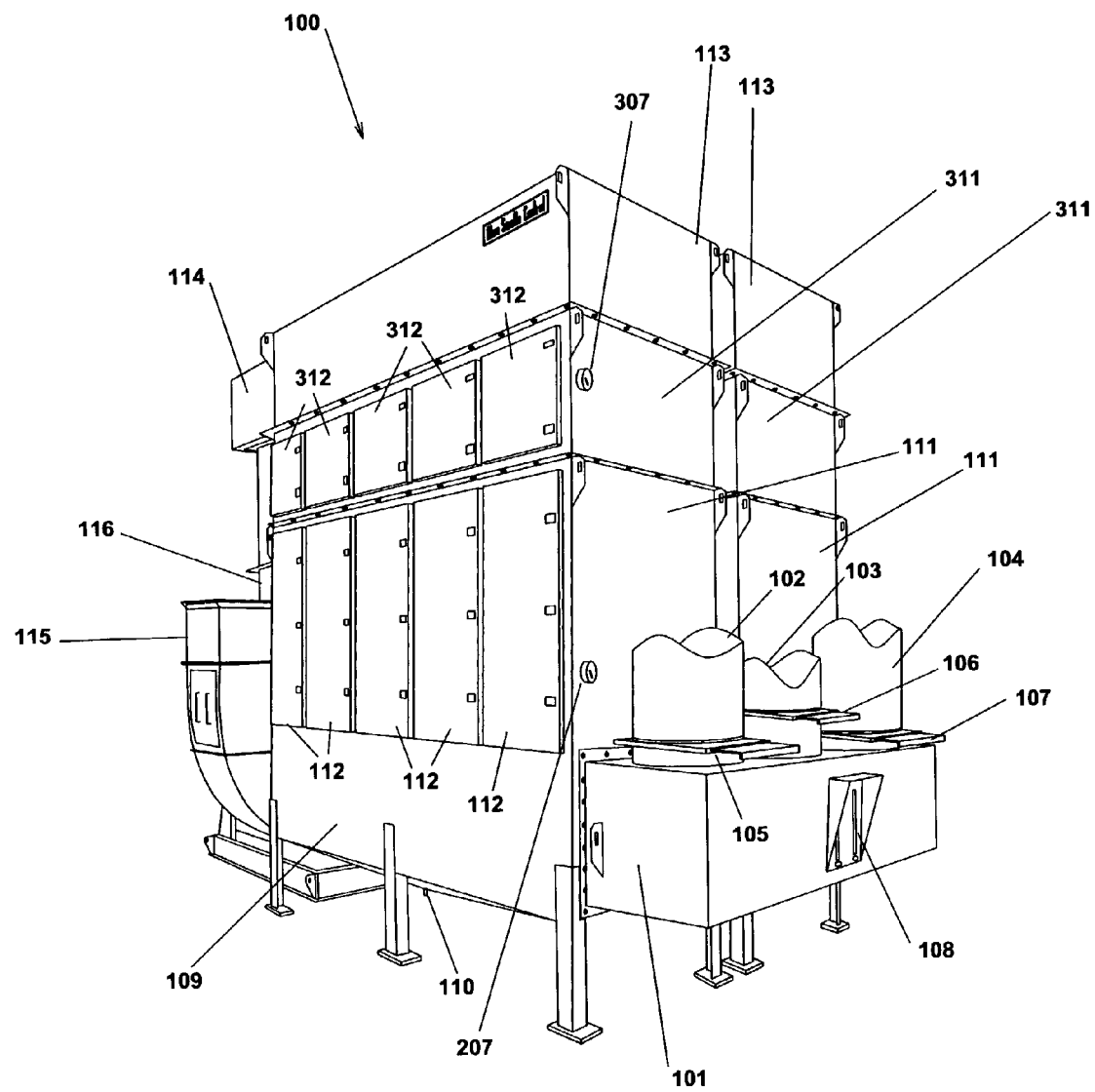
FIG. 1 is an external view of one embodiment of the collector system of the instant invention.

Referring now to FIG. 1, there is shown a representative embodiment of the housing 100 for the system of the instant invention. The housing 100 can be fabricated of aluminum, steel, or other suitable material of sufficient strength and durability.

The housing 100 includes a dirty air inlet manifold 101 which, in the embodiment shown, receives inputs from a plurality of dirty air inlet ducts 102, 103 and 104. It should be understood that the system is not limited to three dirty air inlet ducts as shown but, rather, one, two or more such ducts can be connected to the system, as desired.

A separate dirty air inlet duct blast gate 105, 106 and 107 or other air flow regulating device is provided at the joinder of the representative input ducts 102, 103 and 104 with the inlet manifold 101. The blast gates 105, 106 and 107 are located on top of the inlet manifold and are positioned intermediate the inlet manifold and each dirty air inlet duct. The restive blast gates can be adjusted to enable balancing the airflow collected from each collection area via each air inlet duct.

A fresh air inlet gate 108 is provided in one surface of the manifold 101 to admit the input of ambient fresh air to provide cooling and a carrier, as needed, for the dirty air which is supplied via the inlet ducts and operated upon by the system. The fresh air inlet gate 108 is located on an external wall of the inlet manifold and may be selectively opened to allow cooling fresh air into the inlet manifold 101.

The manifold 101 is cooperatively connected to the dirty air plenum 109 which forms a large open chamber at the bottom of the housing 100. In a typical construction, the dirty air plenum 109 is, effectively, an unobstructed chamber for receiving air from the inlet ducts via the manifold 101 (if required).

A suitable drain 110 or outlet is provided at the bottom of the dirty air plenum 109 through which the oil removed from the dirty air (as discussed infra) can be drained. In order to enhance the draining capability of the drain 110 and the plenum 109, the plenum may include sloped surfaces.

Immediately above the dirty air plenum 109 (or as an upper portion thereof) is the filter housing 111. The filter housing 111 is constructed to stow and support a plurality of filter stages described infra. The filter housing 111 includes one or more access doors 112 in at least one side thereof to permit access to the filter stages. As shown in FIG. 1, multiple filter housings 111 can be provided.

At the top of the housing 100, above the filter housing 111, is the clean air plenum 113 which receives the filtered air from the filter stages in the filter housing. The clean air plenum 113, like the dirty air plenum 109, is generally a single large chamber. As noted above, it must be understood that multiple filter housings 111 may be mounted on or joined to a single dirty air plenum 109. In this case, the clean air plenum 113 may comprise as many chambers as there are filter housings 111 with a respective interconnection between the filter housing 111 and the clean air plenums 113.

A clean air manifold 114 is shown attached to the clean air plenum (or plenums) for exhausting the cleaned air from the system.

A fan assembly 115 which may include a drive motor and the like is connected to the clean air manifold 114 to create an airflow or draft which moves upwardly through the housing 100 from the dirty air plenum 109, through the filter housing 111, and then through the clean air plenum 113 to the clean air manifold 114 and out the fan assembly 115 exit (which is located behind the housing 100 as shown in FIG. 1).

In one embodiment, an exhaust damper assembly 116 may be interposed between the clean air manifold 114 and the inlet to the fan assembly 115 for the purpose of controlling airflow through the system. The exhaust damper 116 is for use with the blower/motor assembly to control system airflow. The exhaust damper 116 is located on the blower inlet box of fan assembly 115 and is connected to the clean air exhaust manifold 114.

During normal operation, contaminated air enters the Blue Smoke Control collection system from inlet ducts, through the dirty air inlet manifold 101. The incoming air slows and turns upward in the dirty air plenum 109. This causes (or permits) larger oil mist droplets and particles to fall out of the airstream and settle into the chamber of the dirty air plenum 109.

The vertical air flow passes through a plurality of generally planar (or horizontal) filter stages mounted within filter housing 111, which filter stages are designed to collect and coalesce additional relatively large oil droplets and particles in the air. These filter stages are, typically, reusable and may be cleaned periodically.

A further planar filter stage, also mounted in the filter housing 111, provides the next level of filtration for the air that has passed through the first filter stages but still contains smaller oil droplets. This further stage is, typically, a disposable filter that can be replaced when it becomes plugged or clogged.

The output filter stage is in filter housing 111, typically, a flexible filter that wraps around a cylindrical shaped filter. The wrap filter stage collects and coalesces oil mist into larger droplets. The cylindrically shaped filter comprises a pleated synthetic medium similar to cellulose or the like which is designed to collect, coalesce and drain fine oil mists from the air stream. The vertical orientation of the wrap promotes drainage of the droplets into a dirty air plenum at the bottom of the system. The air which passes through the cylindrical filter is, typically, free of contaminants and is collected in the clean air plenum 113 before it is vented to the atmosphere via the outlet manifold 114.

In another embodiment of the invention, a filter stage 311 can be added to the system, if so desired. The stage 311 is also fabricated of steel, aluminum, or other suitable material and is connected to housing 111 by a suitable sealing mechanism.

Stage 311 includes activated charcoal filters (see infra) through which the air flows. Typically, the filter stage 311 is inserted between the filter housing 111 and the clean air plenum 113 in order to remove odor from the air after the oil cleansing operation. Suitable access doors 312 (similar to doors 112) are provided in the filter stage 311 to permit servicing of the individual charcoal filters therein.

Figure 2:
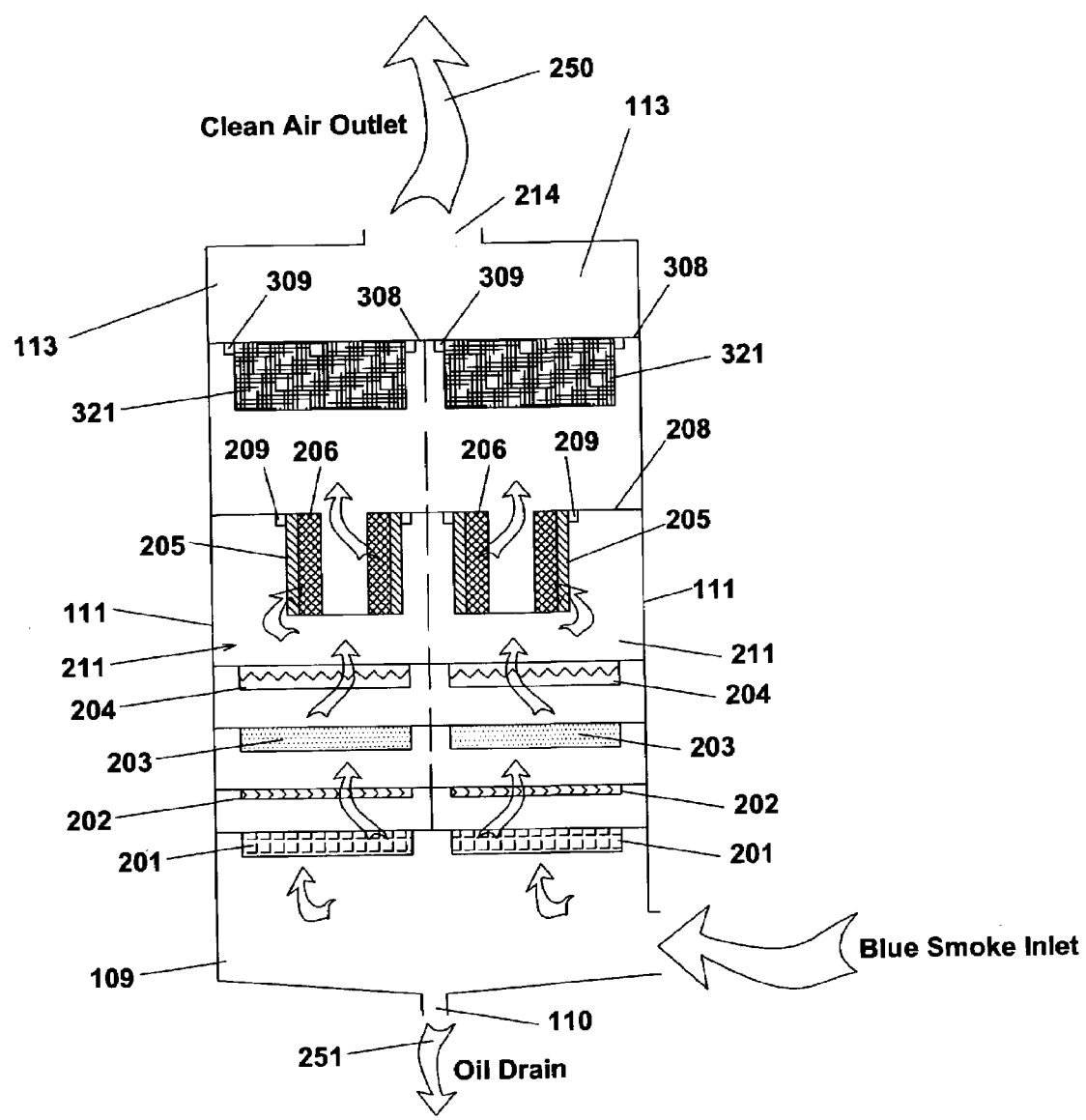
FIG. 2 is a schematic representation of a preferred embodiment of the filtration and collection stages of the instant invention.

Referring now to FIG. 2, there is shown a schematic representation of one embodiment of the filtration and collection system of the instant invention.

As shown in FIG. 2, a system of vertical parallel filtration paths 211 is provided in parallel filter housings 111. Of course, these vertical filtration paths, as represented by the several arrows, may be combined as a single path or expanded to multiple parallel paths, if so desired.

In this embodiment, six separate filtration stages are depicted in each vertical filtration path. Of course, some of these stages can be combined or expanded as required by the user and/or the specific application of the system.

In the system shown in FIG. 2, the first three filter stages are all-metal and are designed for long life with periodic cleaning. The cleaning frequency is a function of the amount of dust and contaminants entrapped in the collected air.

For example, the first-stage filter 201 is, typically, a 4-inch thick metal impinger filter. This filter is designed for long life in asphalt oil mist (blue smoke) collection applications. The filter 201 is designed for strength and durability inasmuch as it may require periodic cleaning.

The second-stage filter 202 is, typically, a 1-inch thick layered wire screen filter. This filter is also designed for long life in asphalt oil mist collection applications. Thus, filter 202 is designed for strength and durability so that it may endure periodic cleaning.

The third-stage filter 203 is, typically a 4-inch thick dense wire mesh filter. This filter is designed for long life in asphalt oil mist collection applications. Filter 203 is also designed for strength and durability so that it, too, may be reusable and withstand periodic cleaning.

The fourth-stage filter 204 is, typically, a 4-inch thick fiber filter with a cardboard frame. This filter is a disposable filter that must be replaced when it becomes clogged.

The fifth-stage filter 205 is a flexible pad made of polyester or the like in the form of a cylindrical wrap which is designed to collect and coalesce into larger oil droplets any fine oil mist which may have passed through the prior filter stages. The vertical orientation of the wrap filter 205 promotes downward drainage of the collected droplets. The wrap filter 205 also collects particulate that may be in the airstream, extending the life of the sixth stage filter element.

The sixth-stage filter 206 is in the form of a cylinder which supports the filter 205 which is wrapped therearound. The filter 206 is, typcially, attached to tube sheet 208 by an appropriate locking mechanism 209 to prevent vertical "blow by" action. The filter 206, typically, is a pleated synthetic medium similar to cellulose or the like which is designed to collect, coalesce, and drain any fine oil mists which may have passed through filter 205.

The blue smoke control filter cartridge 206 is made from a pleated synthetic filter similar to cellulose or the like developed exclusively for collecting oil mist and synthetic coolants. This medium, combined with the outer wrap, allows the oil collected by the filter cartridge 206 to drain downwardly into the dirty air plenum 109 and prevents the collected oil from entering the clean air stream at the clean air outlet 214. In addition, situating the filter cartridges vertically inside the collector, allows gravity to aid the drainage process. The result is more complete capturing of the oil droplets, easier maintenance and higher filtration efficiency for the system.

As oil mist particles coalesce and form larger droplets in filter 206, the droplets become large enough to run down the filter medium and drain back into the dirty air plenum collector 109 due to gravity.

During normal operation, the droplets will drain on both the inside and outside of the filter element. Conversely, the clean, filtered air is passed through the final filtration stage into the clean air plenum 113 as described supra.

Thus, clean, mist-free air exits the filter section and enters the clean air plenum, exhausting out the clean air plenum outlet 214 (for example to clean air plenum 114 in FIG. 1) as suggested by arrow 250. The collected oil is drained from the dirty air plenum 109 for disposal as suggested by arrow 251.

The optional seventh filter stage 321 comprises a suitable activated carbon filter which may be in cartridge form or the like. These cartridges are, typically, 12 inches thick and are appropriate for absorbing objectionable odors. These cartridges are generally disposable without special waste handling. When utilized with the system, the filter stage 321 (or cartridge) is mounted on a tube sheet 308 by a suitable locking mechanism 309 to prevent blow-by action.

Typically, filters 204, 205 and 206 (as well as optional filter 321) are disposable filters which should be replaced when they become clogged. The life of these filters is a function of the amount of dust entrapped in the collected air.

The collector system employs magnehelic gauges 207 and 307 (see FIG. 1) to monitor the pressure drop between the fifth-stage filter wrap 205, the sixth-stage filter 206 (as well as stage 7) and the clean air plenum. As these filters become loaded with contaminant, restriction to airflow increases. When the restriction reduces airflow below acceptable levels as measured by the gauges 207 and/or 307, the respective filters need to be serviced.

All filter stages of filters are readily accessible through the filter access doors 112 and 312 (see FIG. 1) in housing 100. In a preferred embodiment, filter stages are installed two deep behind each door 112 for efficient operation. For ready accessibility, filter removal handles (not shown) enable access to the inner filter without reaching deep into the collector. The filter removal handle enables the rear filter to be pulled out to the access opening for service.

In summary, the Blue Smoke control collector utilizes the principal of vertical or "up flow" of the air stream. Up flow enables the collected oil to drip down into the dirty air plenum, thus preventing the collected liquid from entering the clean air stream. Allowing gravity to aid the drainage process results in more efficient collection, longer filter life, and easier maintenance.

Thus, there is shown and described a unique design and concept of a blue smoke control collector system. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A filtration system for removing air borne asphalt oil droplets from the air comprising,
a housing,
an inlet unit mounted adjacent the bottom end of said housing for receiving dirty air which carries air-borne asphalt oil droplets,
a fresh air gate mounted in said inlet unit to selectively admit ambient fresh air which mingles with the dirty air,
a dirty air plenum mounted to said inlet unit adjacent the bottom end of said housing to receive air from said inlet unit,
an air moving unit mounted adjacent to said housing for drawing air through said housing in an upward direction from said dirty air plenum,
a plurality of filter stages stacked vertically within said housing above said dirty air plenum whereby air from said dirty air plenum passes vertically upward through each of said filter stages and produces filtered air,
an outlet for venting filtered air from said housing, and
a drain for removing oil from said dirty air plenum which oil has been removed from the air by said filter stages.

2. The system recited in claim 1 wherein,
at least one of said filter stages is a planar structure disposed horizontally in said housing, and
at least one of said filter stages is a cylindrical structure disposed vertically in said housing.

3. The system recited in claim 1 wherein,
at least one of said plurality of filter stages is a disposable filter, and
at least one of said plurality of filter stages is a reusable filter.

4. The system recited in claim 3 wherein,
said disposable filter is fabricated of a pleated cellulosic material.

5. The system recited in claim 4 wherein,
said disposable filter is formed in a cylindrical shape.

6. The system recited in claim 5 wherein,
said disposable filter is disposed within said housing wherein air passes vertically through the center of the cylindrical shape.

7. The system recited in claim 3 wherein,
said reusable filters are fabricated of a coarse mesh-like material.

8. The system recited in claim 7 wherein,
said reusable filter is formed in a generally planar shape.

9. The system recited in claim 8 wherein,
said reusable filter is disposed within said housing such that air passes vertically through the planar shape thereof.

10. The system recited in claim 1 wherein,
at least one of said filter stages includes an odor removing component.

11. The system recited in claim 10 wherein,
said odor removing component comprises activated charcoal.

12. The system recited in claim 1 wherein,
said inlet unit includes a manifold and a plurality of inlet ducts, and
at least one adjustable gate intermediate at least one of said inlet duct and said manifold.

13. The system recited in claim 1 including,
a clean air plenum mounted intermediate said plurality of filter stages and said outlet.

14. The system recited in claim 1 wherein,
said air moving unit comprises a fan assembly.

15. The system recited in claim 1 including,
an exhaust damper mounted adjacent said air moving unit for controlling airflow through the system.

16. A filtration system for removing air borne asphalt oil droplets from ambient air comprising,
a housing for receiving ambient air which carries air-borne asphalt oil droplets,
a fan mounted to said housing to produce vertically upward air flow through said housing,
a plurality of filter stages stacked vertically within said housing whereby air passes vertically through each of said filter stages in series and produces filtered air,
at least one of said plurality of filter stages is a cylindrical, disposable filter, and
at least one of said plurality of filter stages is a planar, reusable filter,
an outlet for venting filtered air from said housing to the ambient, and
a drain for removing oil from said housing which oil has been removed from the air by said filter stages.

17. The system recited in claim 16 wherein,
at least one of said filter stages includes an odor removing component.

18. The system recited in claim 17 wherein,
said odor removing component comprises activated charcoal.

19. A filtration system for removing air borne asphalt oil droplets from ambient air comprising,
a housing,
a plurality of filter stages stacked vertically above one another within said housing,
an inlet plenum mounted under the bottom end of said housing,
an inlet unit mounted adjacent to said inlet plenum for receiving ambient air which carries air-borne asphalt oil droplets and supplying same to said inlet plenum,
an outlet plenum mounted above the top end of said housing for venting filtered air from said housing,
an air moving unit mounted adjacent to said housing for drawing air through said housing in an upward direction from said inlet plenum into said outlet plenum whereby air from said inlet plenum passes vertically upwardly through each of said filter stages and produces filtered air in said outlet plenum, and
a drain for removing oil from said inlet plenum which oil has been removed from the air by said filter stages.

20. The system recited in claim 19 including,
an input control mounted in said inlet unit to selectively admit fresh air which mingles with said ambient air.

* * * * *